United States Patent [19]
Hanif et al.

[11] Patent Number: 6,141,677
[45] Date of Patent: *Oct. 31, 2000

[54] METHOD AND SYSTEM FOR ASSIGNING THREADS TO ACTIVE SESSIONS

[75] Inventors: Mohammad Hanif, Fremont; Kazuhisa Yanagihara, Santa Cruz, both of Calif.

[73] Assignee: Apple Computer, Inc., Cupertino, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/542,834

[22] Filed: Oct. 13, 1995

[51] Int. Cl.$^7$ .................................................. G06G 9/00
[52] U.S. Cl. ............................................................ 709/100
[58] Field of Search ....................... 395/670–78; 709/100, 709/101, 102, 103, 104, 105, 107, 108

[56] References Cited

U.S. PATENT DOCUMENTS

| | | | |
|---|---|---|---|
| 5,212,793 | 5/1993 | Donica et al. | 395/700 |
| 5,485,626 | 1/1996 | Lawlor et al. | 395/650 |
| 5,630,128 | 5/1997 | Farrell et al. | 375/673 |

OTHER PUBLICATIONS

Tanebaum et al, The Amoeba Distributed Operating System, A Status Report, Computer Communications, vol. 14, pp. 324–335 Jul./Aug. 1991.

Modern Operating Systems, A. Tanenbaum: Prentice Hall Pub. Co., 1992; Chapter 12, Processes and Processors in Distributed Systems; pp. 507–511.

*Primary Examiner*—Majid A. Banankhah
*Attorney, Agent, or Firm*—Sawyer Law Group LLP

[57] ABSTRACT

A method and system for processing active AFP sessions by a multithreaded file system process. The file server is coupled to entities on a network, wherein an open AFP session is created when the file server and an entity on the network establish communication, and an active AFP session is created when an AFP session has a pending request. The method and system comprises monitoring the file server for active AFP sessions. When a first active AFP session having at least one AFP request becomes available, the method and system assigns a first one of the threads to the first active AFP session for processing. The method and system preempts the processing of the first active AFP session by the first one of the threads when additional active AFP sessions are available so that the first one of the threads becomes available to process additional active AFP sessions, whereby equal processing time is provided to each one of the active AFP sessions.

13 Claims, 6 Drawing Sheets

FIG. 7 FAIR-USE METHOD

METHOD AND SYSTEM FOR ASSIGNING THREADS TO ACTIVE SESSIONS

CROSS-REFERENCE TO RELATED APPLICATIONS

The present application is related to applications Ser. No. 08/542,944, entitled "A METHOD AND SYSTEM FOR INCREASING THE NUMBER OF ENTITIES THAT CAN BE SERVICED BY A FILE SERVER" and Ser. No. 08/542,836, entitled "A METHOD AND SYSTEM FOR MAXIMIZING THE USE OF THREADS IN A FILE SERVER FOR PROCESSING NETWORK REQUESTS," filed on the same date as the present application and assigned to the assignee of the present application.

FIELD OF THE INVENTION

The present invention relates to a method and system for transferring data between a source and a plurality of network entities, and more particularly to a method and system for utilizing a multithreaded file server software process for processing requests in the network in a manner that provides equal processing time for all active sessions.

BACKGROUND OF THE INVENTION

In the computing industry, it is quite common to transfer data and commands between a plurality of data processing devices, such as computers, printers, displays, terminals, and other network resources. Local Area Networks (LANs) allow the transfer of data between a localized set of computing and peripheral devices, typically in the same geographical area such as one building or a plurality of buildings closely situated together. Examples of such LANs may be found in U.S. Pat. Nos. 4,063,220, 4,661,902, and 4,689,786.

In the AppleTalk® (a trademark of Apple Computer, Inc.) network system, each "node" or computer, printer, peripheral, and other network resources share resources with a file server. The file server includes two main AppleTalk protocols called the AppleTalk Filing Protocol (AFP), AppleTalk Session Protocol (ASP), and the operating system of the file server includes the AppleTalk Transaction Protocol (ATP). The AFP is a protocol dealing with issues that are file system related. The AFP uses the ASP to receive file system requests from network entities and to send responses back to the entities. The request and responses may be partitioned into smaller data packets and the ASP uses the ATP to send and receive these data packets over the network.

The ASP is a protocol for maintaining network sessions between the file server and the network entities. A session is opened once an entity establishes communication with the server. The ASP keeps information about the entity in a session object. In addition, a corresponding session is opened in the AFP for that entity with different information. When the ASP receives an ASP request from the network, the ASP passes the request to the AFP for processing.

To improve the processing performance of the file server, the file server is implemented as a multithreaded process. Network tasks are broken into sub-tasks and assigned to individual threads for further processing. Each thread of execution has its own stack and therefore requires more memory. Conventional methods for assigning the threads to the AFP sessions require more threads than necessary based upon the number of AFP sessions and do not guarantee that each AFP session will receive its share of processing time.

What is needed therefore is a method for assigning threads to AFP sessions in a manner that is efficient, requires less threads and system resources, and provides each AFP session with equal processing time. The present invention addresses such a need.

SUMMARY OF THE INVENTION

The present invention provides a method and system for processing active AFP sessions by a file system process. The file server is coupled to entities on a network, wherein an open AFP session is created when the file server and an entity on the network establish communication, and an active AFP session is created when an AFP session has a pending request. The method and system comprises monitoring the file server for active AFP sessions. When a first active AFP session having at least one AFP request becomes available, the method and system assigns a first one of the threads to the first active AFP session for processing. The method and system preempts the processing of the first active AFP session by the first one of the threads when additional active AFP sessions are available so that the first one of the threads becomes available to process additional active AFP sessions, whereby equal processing time is provided to each one of the active AFP sessions.

According to the system and method disclosed herein, the present invention processes active AFP sessions based on availability, which improves throughput and increases system performance. In addition, the method and system is memory efficient because less threads are required for processing the session, which reduces memory usage.

DESCRIPTION OF THE INVENTION

The present invention relates to an improvement in a server utilized in a network. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
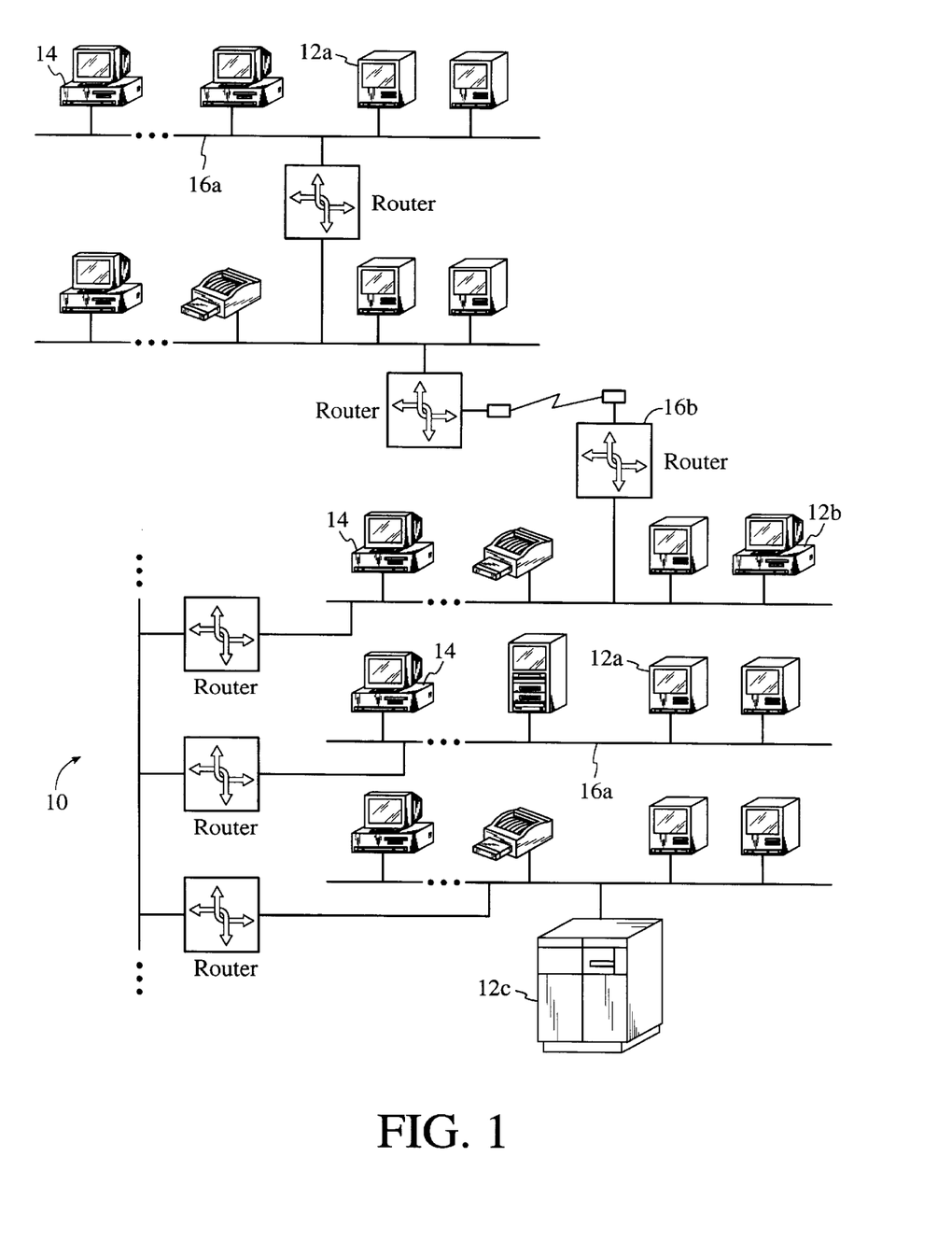
FIG. 1 is a block diagram illustrating a computer network system.

FIG. 1 is a block diagram illustrating a computer network environment in which the present invention resides. The network 10 may include a plurality of computers, such as personal computers 12*a*, minicomputers 12*b*, and mainframes 12*c*, and server devices 14, such as a file and printer servers. For the purposes of this specification, all data processing and peripheral devices which are coupled to the network are collectively referred to as entities 12. The entities 12 may be connected through a variety of network connection devices 16 such as cables 16*a* and routers 16*b*, for example. The purpose of the network 10 is to eliminate access barriers resulting from physical separation between the various entities 12 and to share the resources the entities 12 contain.

Figure 2:
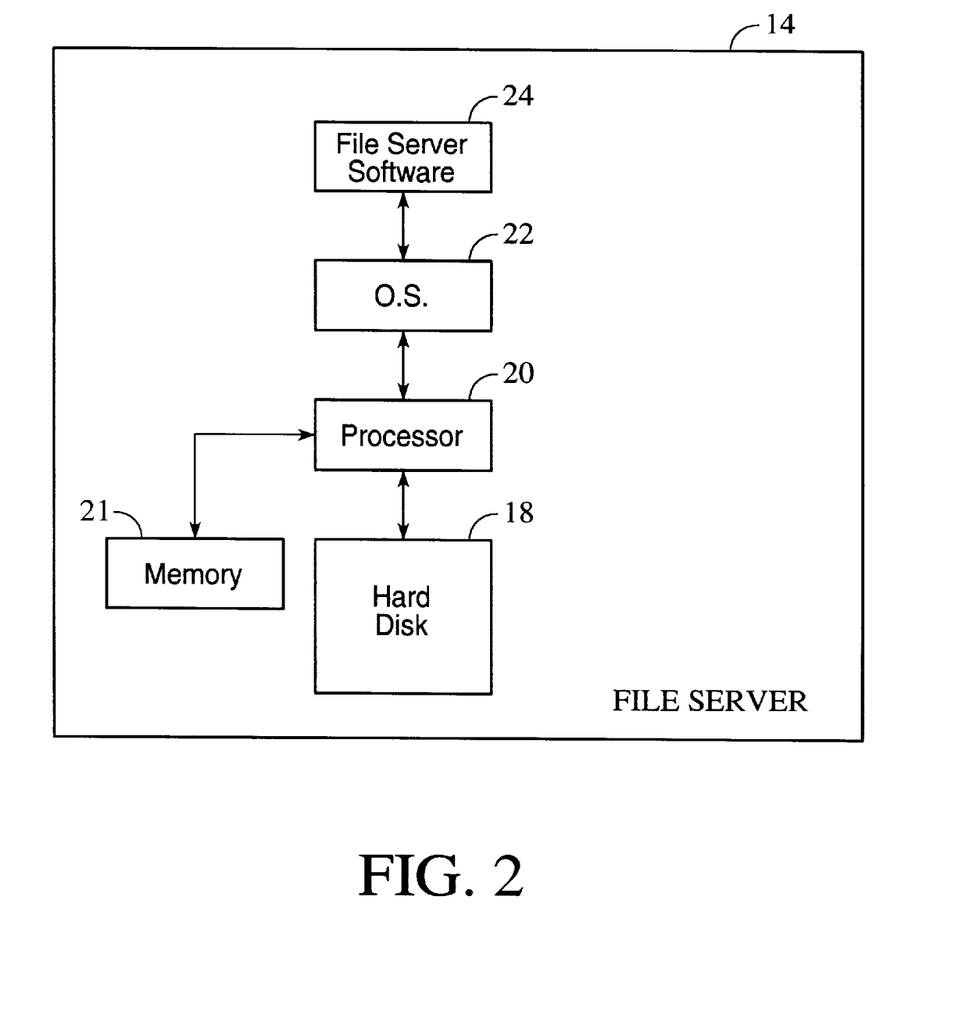
FIG. 2 is a block diagram of a server 14 in which the present invention is implemented.

FIG. 2 is a block diagram of a server 14 in which the present invention is implemented. The server includes one or more hard disk drives 18, a processor 20, memory 21, an operating system 22, and file server software 24. The file server software 24 enables a computer to become a file server 14 for one or more entities 12, on the network.

In a preferred embodiment, the file server software 24 is Appleshare File Server software, which utilizes a protocol architecture called AppleTalk. Both Appleshare and AppleTalk were designed and developed by Apple Computer, Cupertino, Calif. Also in a preferred embodiment, the processor 20 is a PowerPC manufactured by Motorola and, the operating system 22 is a Macintosh Operating System, such as System 7.5, for example.

Figure 3:
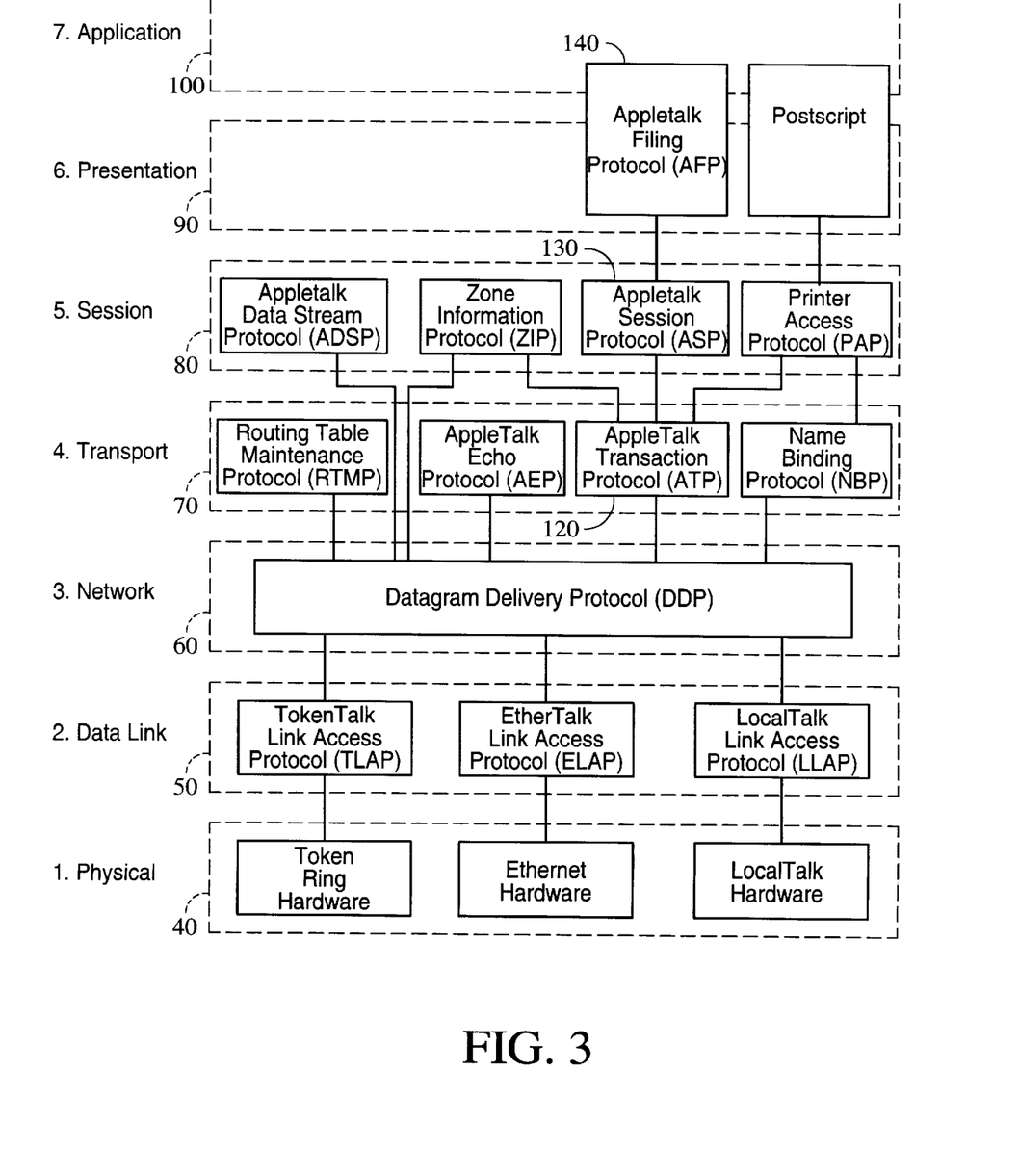
FIG. 3 is a diagram illustrating the AppleTalk protocol architecture within the framework of the Open Systems Interconnection (OSI) reference model.

Referring to FIG. 3, the AppleTalk protocol architecture is shown within the framework of the Open Systems Interconnection (OSI) reference model developed by the International Standards Organization (ISO). The OSI model defines the concepts of a protocol and a service interface that includes seven layers: Physical 40, Data Link 50, Network 60, Transport 70, Session 80, Presentation 90, and Application 100. The layers allow data packets to be transmitted from a variety of hardware to another, and from one process (socket) to another. Each layer functions as a separate process or filter that either appends protocol information onto existing data packets transmitted in the network 10, or routes appropriate data packets through the network 10 depending on the type of packet and the particular layer in which the packet resides.

Referring to both FIGS. 1 and 3, the higher-level network services in both OSI and AppleTalk are built using the model of a entity 12 issuing a sequence of commands to a server 14. The server 14 carries out the commands and then reports the results to the entity 12. The present invention relates to the interaction between the following higher-level AppleTalk protocols: the AppleTalk Transaction Protocol (ATP) 120, the AppleTalk Session Protocol (ASP) 130, and the AppleTalk Filing Protocol (AFP) 140. The AppleTalk protocol is described in further detail in *Inside AppleTalk®*, by Gursharan Sidhu, Richard F. Andrews, and Alan B. Oppenheimer (2d Ed. 1990), published by Addision-Wesley, which is herein incorporated by reference.

The purpose of the AFP 140 is to allow the server to share files with the entities 12 on the network 10 through network commands. The ASP 130 serves the AFP 140 and is used to establish a connection, called a session, between an entity 12 and the server 14. A command from an entity 12 to a server 14 may require several data packets to be sent across the network 10. The ATP 120 provides the ASP 130 with a transaction service for sending and receiving packets across the network 10.

Typically, packets are sent and received between an entity 12 and the server 14, but packets may also be sent and received between software processes. Each entity 12 in the network 10 may include one or more software processes. One software process can request that another software process perform a higher-level function and then report the outcome. A software process that makes use of the services of another software process is called a client. This interaction between a requesting client and a responding client is called a transaction, and is handled by the ATP 120. For purposes of this discussion, when an entity 12 on the network initiates a transaction with the file server 14, the entity 12 is the requesting client and the file server 14 the responding client.

Figure 4:
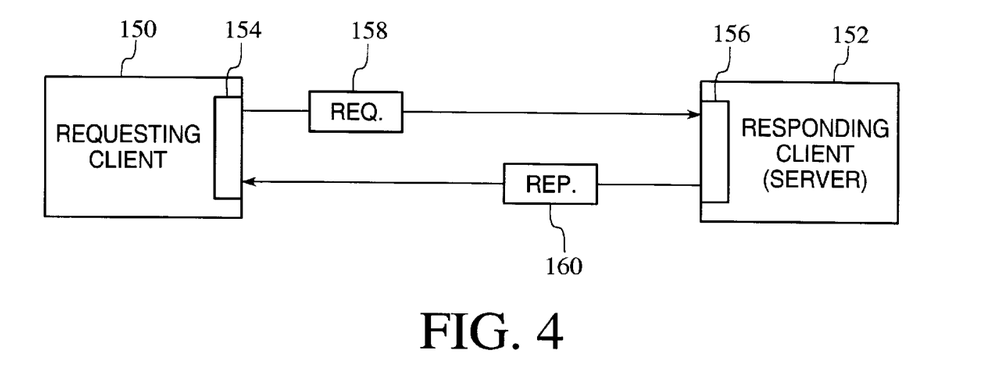
FIG. 4 is a block diagram illustrating the basic structure of a transaction between a requesting client and a responding server.

FIG. 4 is a block diagram illustrating the basic structure of a transaction between a requesting client 150 and a responding server 152. In order to send and receive transactions, a client must first create an addressable entity on the network called a socket. This is accomplished by both the requesting client 150 and the responding server 152 making a call to the ATP 120 to open a respective socket 154 and 156. The socket opened at the responding entity is called a transaction listening socket. Both the requesting client 150 and the responding server 152 can have multiple sockets for receiving/transmitting transactions, where each socket is identified by a unique 8-bit socket number.

The requesting client 152 initiates a transaction by issuing a call to the ATP 120 and supplying the parameters of the request. Once the transaction request packet 158 is received by the socket 156 of the responding server 152, the transaction request is serviced and the responding server 152 returns a transaction response packet 160 reporting the transaction outcome.

Before an entity 12 can send transaction requests to a server 14, a session must be established between them. Whereas the ATP 120 handles individual transactions, the ASP 130 establishes and maintains sessions between each entity 12 and the server 14. For the duration of the session, the entity 12 can send a sequence of commands to the server 14. The ASP 130 ensures that the commands are delivered without duplication in the same order as they were sent, and sends the results of the commands back to the entity 12. In order to open and then maintain sessions, the ASP 130 utilizes two different types of sockets for receiving two different types of requests.

Figure 5:
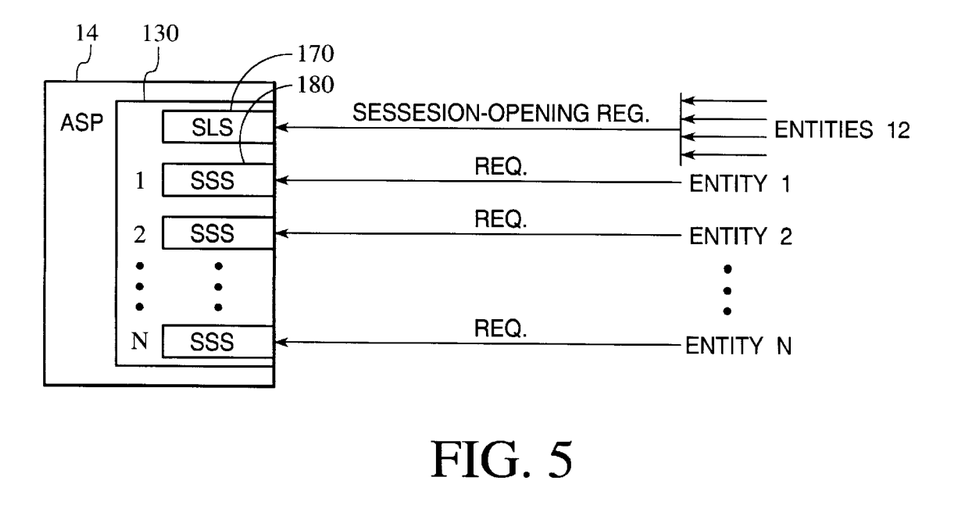
FIG. 5 is a block diagram illustrating the two different types of sockets utilized by the ASP.

FIG. 5 is a block diagram illustrating the two different types of sockets utilized by the ASP 130. In order to make itself known on the network 10 to other entities, the ASP 130 calls the ATP 120 (FIG. 3) to open an ATP responding socket, known as the session listening socket (SLS) 170. The SLS is used to listen for session-opening requests from the entities 12 on the network 10.

Once a session is established between an entity 12 and the server 14, a server session socket (SSS) 180 is used to listen for network requests from a particular entity 12 in all further communication during that session. Thus, for every open session between an entity 12 and the server 14, there is a corresponding network addressable SSS in which the entity 12 sends all future requests.

Once an entity 12 sends a session-opening request to the server 14 and a session is established, a session object is created in the server 14 in which all information about the entity 12 is kept. In addition, a corresponding session is opened in the AFP 140 for that entity 12 with different information. Therefore, if there are N ASP sessions there are N AFP sessions. When the ASP 130 receives an ASP request from an SSS 180, the ASP 130 passes the request to the AFP 140.

Referring again to FIG. 2, conventional file server software 24 processes AFP requests from the ASP sequentially.

Since conventional file server software 24 only has one thread of execution, an AFP request must be fetched and processed to completion before the next can be processed. If the request is for a file from the disk, the server 14 has to block while waiting for the disk and cannot process another request. If the filer server 14 is a dedicated machine, as is commonly the case, the processor 20 is simply idle while the file server 14 waits for the hard disk 18. The net result is that many fewer session requests per second can be processed, resulting in poor network performance.

One method to increase the throughput of the file server software 24 is to use multiple threads of execution. In a multithreaded process, there are multiple scheduable threads of control that share both address space and resources. Since typical file servers 14 only have one processor 20, the threads are time-sliced on the processor 20. Although multithreaded file server software speeds the throughput of the file server, prior methods have failed to assign threads to session request in an efficient manner.

Accordingly, the present invention is a method and system for processing outstanding requests from active AFP sessions in a fair and efficient manner. In particular, the present invention utilizes a multithreaded file server software process for processing AFP requests, and provides a fair-use method for assigning the threads to AFP requests to provide equal processing time for all active AFP sessions.

Figure 6:
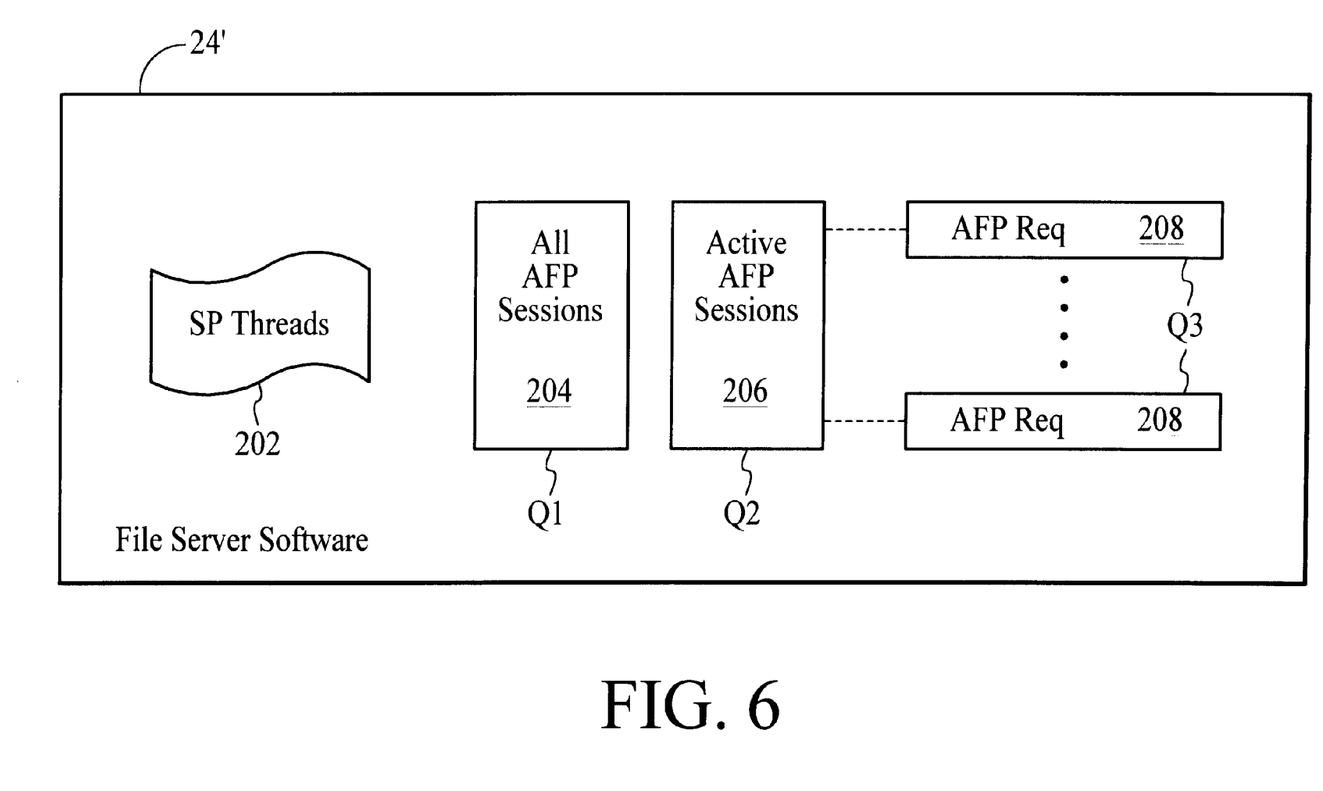
FIG. 6 is a block diagram of a preferred implementation of the file fair-use method of the present invention for assigning AFP sessions to SP threads.

To more particularly illustrate the fair-use method and system of the present invention, refer now to FIG. 6 depicting a block diagram of one implementation of such a system. The file server software 24' of the present invention includes a plurality of session protocol (SP) threads 202, and three queues Q1, Q2, and Q3 for maintaining AFP session requests.

Since each SP thread 202 requires a significant amount of memory, the number of SP threads 202 utilized is minimized such that the total number of threads 202 is significantly less than the total number of sessions supported by the server 14. Similar to traditional processes (i.e., processes with only one thread of execution), each thread 202 can be in any one of several states: running, blocked, and ready. A running thread is currently being executed by the processor 20 (FIG. 2). A blocked thread is waiting for another thread to unblock it, and while blocked, another thread in the same process can run. And a ready thread is scheduled to be executed by the processor 20.

The three queues Q1, Q2, and Q3, are used to maintain the status of AFP sessions. All open AFP sessions 204 sent to the AFP 140 from the ASP 130 are stored in the queue Q1. Open AFP sessions 204 that have outstanding requests are called active AFP sessions 206 and are stored in Q2. Each active AFP session 206 may have a varying number of pending AFP request 208 at any given time, and these outstanding AFP requests 208 are stored in a respective queue Q3 for each active AFP session.

Before describing the fair-use method for assigning active AFP sessions 206 to SP threads 202 in detail, it is helpful to first describe the rules the method follows. First, the assignment of active AFP sessions 206 to SP threads 202 is on a first come first serve basis. Second, the AFP requests 208 from an active AFP session 206 are processed in sequence to preserve the order of the request in accordance with ASP functionality. Third, at any given time, one AFP session 206 is associated with only one SP thread 202, and until one request 208 is serviced, other requests cannot be extracted from the queue Q3. Finally, the primary goal of the method is to achieve utilization of all SP threads 202 when the number of active AFP sessions is greater than or equal to the number of threads 202.

Figure 7:
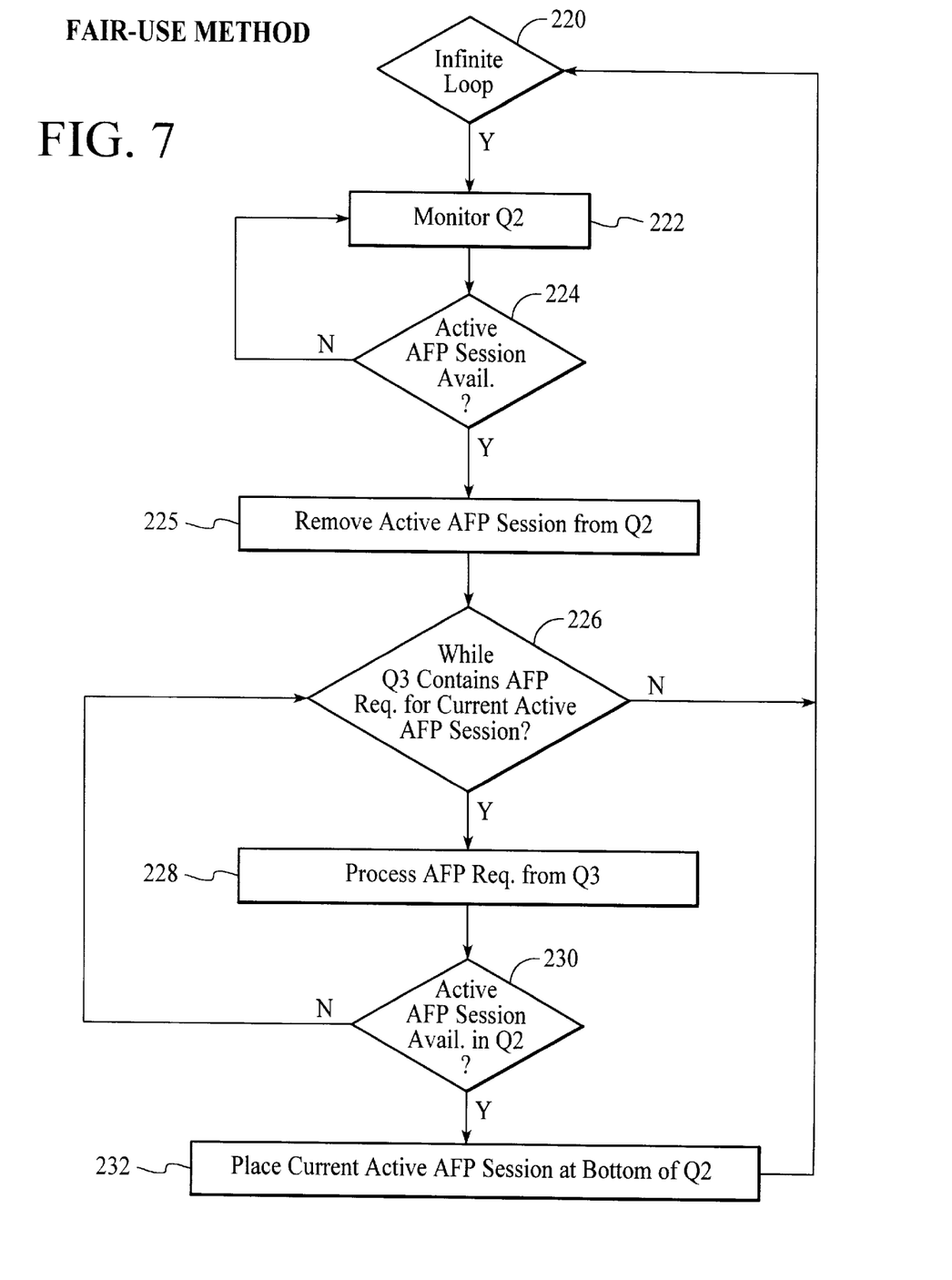
FIG. 7 is a flow chart depicting the steps of the fair-use method of the present invention taken by each SP thread 202.

FIG. 7 is a flow chart depicting the steps of the fair-use method of the present invention that are taken by each SP thread 202. Referring to both FIGS. 6 and 7, each SP thread 202 loops continuously in step 220, while monitoring queue Q2 for active AFP sessions to process in step 222. If an active AFP session 206 is not available in step 224, the thread continues to monitor queue Q2. If an active AFP session 206 is available, then the active AFP session 206 is removed from queue Q2 in step 225. Removing the active AFP session is necessary so that another thread does not also process the session. This ensures that the order in which request are processed is preserved. After the active AFP session is removed, then queue Q3 is checked to see if it contains AFP requests 208 for the current AFP session. If so, then the thread performs loop 226.

The loop 226 begins by processing the AFP requests 208 stored in queue Q3 in step 228. After processing an AFP request 208, the thread 202 checks the queue Q2 for any other active AFP sessions 206 in step 230. If the queue Q2 does not contain any other active AFP sessions 206, then the thread 202 continues processing AFP requests 208 in loop 226.

If the queue Q2 does contain another active AFP session 206 in step 230, then the thread 202 places the current active AFP session 206 at the bottom of the queue Q2 in step 232, and begins again at the top of the loop 220. The thread 202 also begins at the top of the loop 220 when the queue Q3 runs out of AFP requests 208 for the current AFP session in step 226.

The present invention assigns AFP sessions 206 to SP threads 202 in a round-robin fashion. An SP thread 202 preempts an active AFP session 206 only when there is another active AFP session 206 waiting in queue Q2. Thus, the fair-use method of the present invention for assigning SP threads 202 to active AFP sessions 206 provides equal processing time to each active AFP session 206 regardless of the number of pending AFP requests 208. In addition, the method is memory efficient because less SP threads 202 are required for processing, which reduces memory usage.

Other approaches of assigning threads 202 to active AFP sessions 206 are less than satisfactory. For example, another approach would be to assign AFP session to threads and process all of that sessions's requests before preempting the process for another active AFP session from queue Q2. This approach would lead to unequal processing time of AFP sessions across the network.

Another method for processing AFP sessions would be to create one thread per AFP session. This method is simple but results in a very expensive solution in terms of system resources. This method is not only memory inefficient, but is also time inefficient as increasing number of threads add significant overhead in maintenance and scheduling.

The fair-use method for assigning SP threads to active AFP session of the present invention provides many advantages over other file server implementations. First, the present invention provides equal processing time to every active AFP session regardless of the number of pending AFP requests. There is no strong association of AFP sessions to SP threads. Instead, SP thread process active AFP sessions based on availability, which improves throughput. Since the method is inherently fair to AFP sessions, no AFP session is left starved of processing time. The method achieves better performance when the number of active AFP sessions is significantly greater than the number of SP threads.

A fair-use method for assigning SP threads to active AFP sessions has been disclosed that provides equal processing time to active AFP sessions. One with ordinary skill in the art will readily recognize that the present invention is not limited to the AppleTalk protocol or the Macintosh file system, but rather can be implemented with any type of network protocol and any type of file system. Software written according the present invention is intended to reside in some form of computer readable medium, such as memory or disk or communicated via a network, and compiled and executed by a processor.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for processing active sessions by a file system process, wherein a file server is coupled to entities on a network and an open session is created when the file server and an entity on the network establish communication, and wherein an active session is created when an open session has a pending request, the method comprising the steps of:
    (a) monitoring the file server for active sessions;
    (b) assigning a first one of the threads to a first active session having at least one request for processing the first active session;
    (c) preempting the processing of the first active session by the first one of the threads, prior to the complete processing of the first active session, when additional active sessions are available; and
    (d) assigning the first one of the threads to each of the active sessions in a round robin fashion to process one or more requests of each one of the active sessions, whereby equal processing time is provided to each one of the active sessions.

2. A method as in claim 1 wherein step (a) further includes the steps of:
    (a1) providing less multiple threads of execution than the total number of active sessions supported by the file server.

3. A method as in claim 2 wherein step (a) further includes the steps of:
    (a2) storing all sessions in a first queue;
    (a3) storing active sessions having pending requests in a second queue; and
    (a4) storing the pending requests of each one of the active sessions in a respective third queue.

4. A method as in claim 3 wherein the file server includes a network protocols having an ASP layer and an AFP layer, and the multiple of threads of execution process requests passed from the ASP layer to the AFP layer.

5. A file server connected to entities on a network for processing network requests, the file server including a processor and memory for executing a file server software process, the file server software process including a network protocol having a first layer, wherein when an entity establishes communication with the file server, a session on the first layer is created, the file server comprising:
    means for executing the software process with multiple threads of execution;
    means for monitoring the file server for active sessions having at least one request;
    means for assigning a first one of the threads to a first active session for processing; and
    means for preempting the processing of the first active session by the first one of the threads, prior to the complete processing of the first active session, when additional active sessions are available, wherein the first one of the threads is assigned to each of the active sessions in a round robin fashion to process one or more requests of each one of the active sessions, whereby equal processing time is provided to each one of the active sessions.

6. A file server as is claim wherein 5 the number of multiple threads of execution is less than the total number of active sessions supported by the file server.

7. A file server as is claim 6 further including:
    a first queue for storing sessions;
    a second queue for storing active sessions having pending requests; and
    a plurality of third queues, wherein each one of the third queues stores the pending requests of a respective active session.

8. A file server as in claim 7 wherein the first layer is an AFP layer, and the multiple threads of execution process AFP requests from AFP sessions.

9. A file server as is claim 8 further including means for associating an active session with only one thread of execution to preserve the order of processing the pending request.

10. A computer-readable medium containing a file server software program for processing incoming network requests, the file server software program including a network protocol having a first layer, wherein when an entity on the network establishes communication with the file server software program a session is created on the first layer, the program containing instructions for:
    (a) executing the software process with multiple threads of execution;
    (b) monitoring the file server for active sessions having at least one request;
    (c) assigning a first one of the threads to a first active session for processing;
    (d) preempting the processing of the first active session by the first one of the threads, prior to the complete processing of the first active session, when additional active sessions are available; and
    (e) assigning the first one of the threads to each of the active sessions in a round robin fashion to process one or more requests of each one of the active sessions, whereby equal processing time is provided to each one of the active sessions.

11. A computer-readable medium as in claim 10 wherein instruction (a) further includes instructions for:
    (a1) providing less multiple threads of execution than the total number of active sessions supported by the file server.

12. A computer-readable medium as in claim 11 wherein instruction (b) further includes instructions for:
    (b1) storing all sessions in a first queue;
    (b2) storing active sessions having pending requests in a second queue; and
    (b3) storing the pending requests of each one of the active sessions in a respective third queue.

13. A computer-readable medium as in claim 12 wherein the first layer of network protocol is an AFP layer.

* * * * *